M. P. HOLMES.
TRUCK.
APPLICATION FILED OCT. 17, 1917.
1,378,810.
Patented May 17, 1921.
2 SHEETS—SHEET 2.
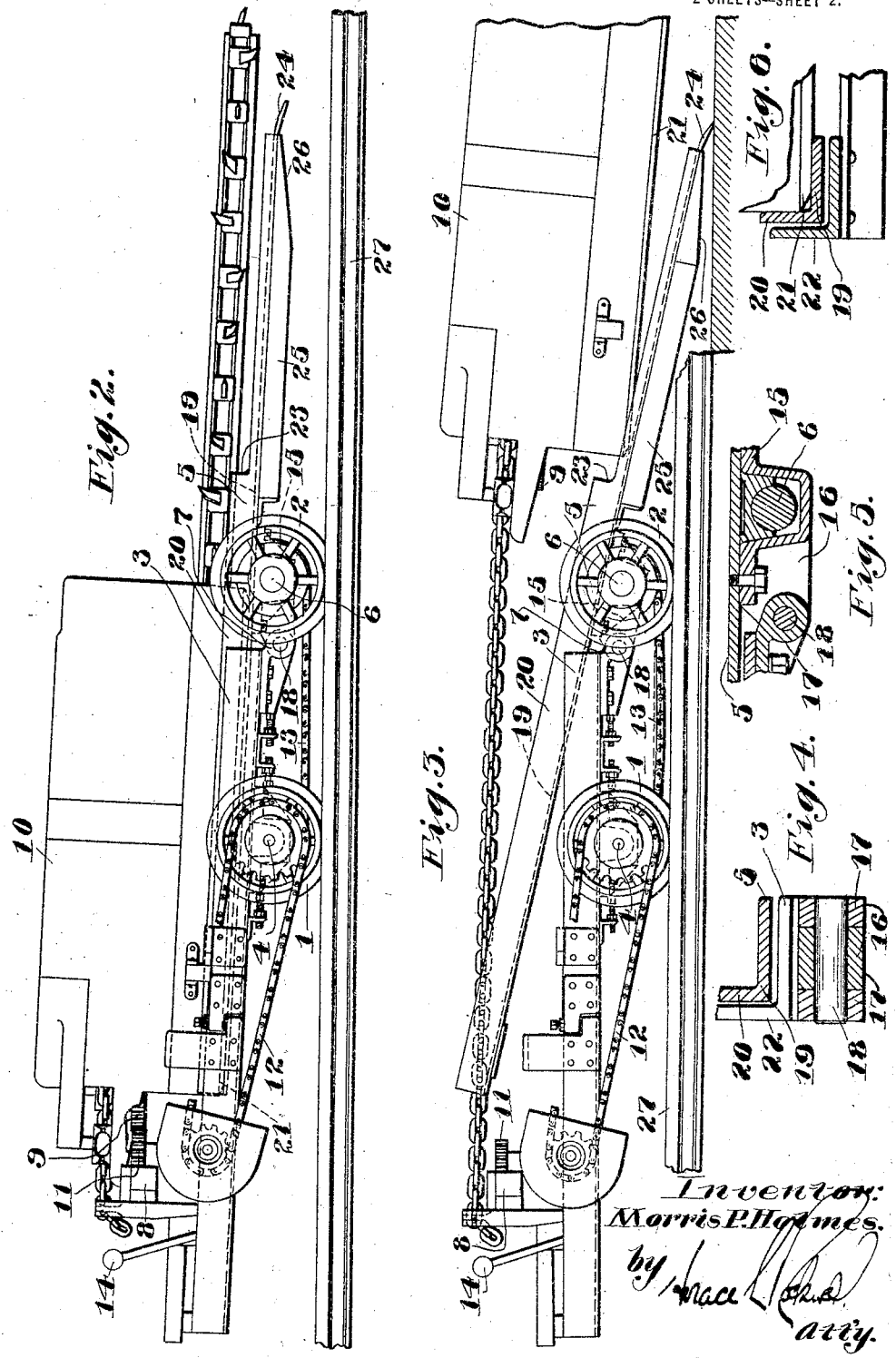

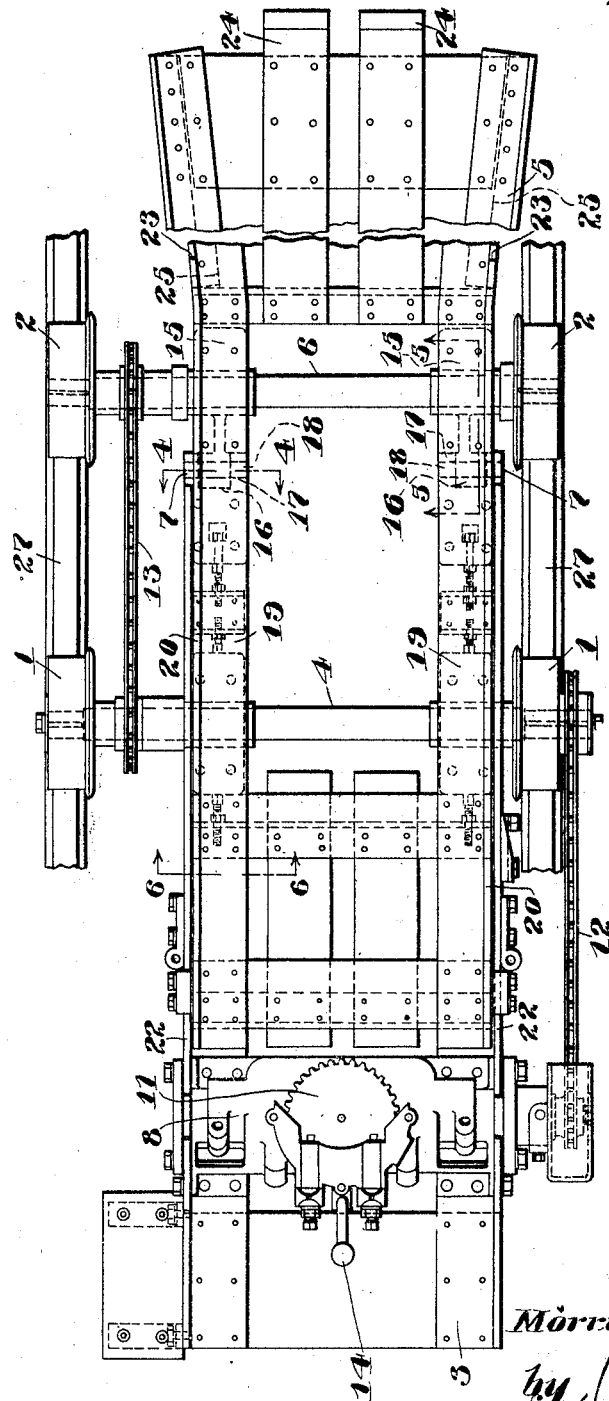

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,810.  Specification of Letters Patent.  Patented May 17, 1921.

Application filed October 17, 1917. Serial No. 197,084.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks.

It has for its object to provide an improved truck especially adapted to use in connection with mining machines, whereby the operation of loading or unloading a mining machine is facilitated and at the same time the construction of the truck is improved and rendered more rugged and better adapted to meet service conditions. These and other objects and advantages of my improved construction will, however, hereinafter more fully appear.

In the accompanying drawings, I have shown for purposes of illustration one embodiment which my invention may assume in practice.

In these drawings,—

Figure 1 is a plan view of a truck constructed in accordance with my improvement.

Fig. 2 is a side elevation of the truck showing a mining machine in loaded position thereon.

Fig. 3 is a side elevation of the truck shown in Fig. 2, the mining machine being shown in partially loaded position thereon.

Fig. 4 is a detail sectional view on line 4—4 of Fig. 1.

Fig. 5 is a detail sectional view on line 5—5 of Fig. 1.

Fig. 6 is a detail sectional view on line 6—6 of Fig. 1.

In this illustrative construction, it will be noted that I have disclosed a mining machine truck of the type described and disclosed in my co-pending application Serial No. 132,121 filed Nov. 18, 1916, the present invention constituting an improvement over the construction shown in that application.

In this construction, it will be observed that the truck is mounted upon wheels 1 and 2 and that each of these wheels carries a coöperating truck element, the rear wheels 1 having the rear machine guiding element 3 of the truck pivotally mounted on their axle 4, while the front wheels 2 have the front machine guiding element 5 of the truck pivotally mounted on their axle 6. As in the construction described in my above mentioned application, these elements 3 and 5 of the truck are also pivotally connected at their adjacent ends and intermediate the axles at 7. It will also be observed that, as heretofore, the rear element 3 carries thereon at its rear end suitable truck driving and braking mechanism indicated at 8, adapted to be operatively connected to a moving part, as for instance a gear 9 on a mining machine 10 through a gear 11 carried on the truck, the power of the mining machine being transmitted to the rear wheels 1 through suitable driving connections including a chain and sprocket connection 12 connected to the rear axle 4, and transmitted from that axle to the axle 6 of the front wheels 2 through a similar chain and sprocket connection 13. It will also be observed that I have provided means for controlling the brake and clutch mechanism including a single controlling lever 14. As, however, this brake and clutch mechanism and its controlling lever are an old and well known part of a truck equipment, and their specific construction forms no part of the present invention, a description of the same in detail is believed to be unnecessary.

In my improved construction, it will be observed that the front element 5 of the truck is rigidly connected to the front axle boxes 15, and that these boxes are pivotally connected to the front end of the rear element 3 at a point adjacent the rear of the front axle and preferably below the axes of the axles and the guiding surfaces of the portions 3 and 5. As shown, a very substantial pivot is provided by forming spaced extensions 16 on the opposite sides of each axle box and journaling the same to suitable forwardly and downwardly disposed portions 17 formed on the front end of the element 3 which are adapted to be received between the extensions 16 and pivoted thereto by means of pins 18. In this construction, it will also be noted that the element 5 is provided with a rearwardly extending portion 19 which is adapted not only to overlie the pivot, but preferably to extend rearwardly a substantial distance therefrom in such a manner as to form an exceedingly rigid construction and resist any tendency of the pivot to buckle under the weight of the mining machine. In a preferred form, this member 19 extends rearwardly to a point in the rear of the rear axle and closely adjacent the truck driving gear 11 so that when the mining machine is brought up onto the truck it overlies this portion 19, the weight of the mining machine thus resting not only upon this member but upon both of the axles with the center of gravity of the machine disposed approximately midway between the axles. It will also be observed that this portion 19 is provided with upstanding flanges 20 adapted to engage the side of the machine shoe 21 and to be confined within suitable flanges 22 of the usual construction provided upon the rear member 3, in such a manner as to resist any lateral swinging movement. Attention is also directed to the fact that in my improved construction the front ends of these flanges 20 are partially cut away on their upper sides, as shown at 23 in such a manner as to permit a relatively free loading and unloading of the machine at an angle when desired and yet at the same time normally to retain the shoe of the machine within the confines of the flanges 20. Attention is also directed to the fact that the front end of this member 5 has been inclined downward, as shown at 24, and that the under side of the same is strengthened by the addition of plates or flanges 25 and is cut off or tapered at 26 to permit the member 5 to come relatively close to the mine bottom at a point in front of the rails 27.

Another advantageous feature of my improved construction lies in the arrangement of the front and back elements of the truck in such a manner that the mining machine, even when in loaded position, has a slight inclination toward the front end of the truck. This permits the unloading of the machine in a lower seam of coal by reason of the fact that there is required a less degree of tilting of the element 5. This slight inclination, which is less than sufficient to cause any tendency of the machine to slide prior to the further tilting of the member 5 and its extension 19, is caused by the construction of the front and back elements of the truck as a whole. Referring to Figs. 3 to 6, it will be noted that the rearwardly extending portion 19 which at its portion adjacent the axle 6 is but a short distance above the axle is separated, as shown in Fig. 6, at a point rearward of the axle 4 by a considerably greater distance by reason of the interposition of the angle 22.

In the use of my improved truck in loading or unloading a mining machine, it will be noted that this construction operates in substantially the same general manner as that described in my above mentioned application, the mining machine when passing off of or onto the truck from the position shown in Figs. 2 and 3, respectively, acting automatically after it passes over the front axle, to depress or raise the portion 19 thereof and simultaneously raise or lower the rear end of the element 3 in such a manner as to bring the front end of the member 5 to the position indicated in Fig. 3 and in engagement with the mine bottom before the rear end of the element 3 engages the rails 27. Of course, it will be understood that in this construction, as in my preceding construction, it is desirable for the brakes (not shown) to be applied to the truck prior to the unloading of the machine. It will also be evident that when the parts assume the position shown in Fig. 3, after the unloading of the machine, the same will remain in that position until the machine is returned to the truck.

In my improved construction, it will be observed that by the provision of the pivot 7 located more closely adjacent the front axle it is possible to have two normally relatively angularly disposed truck elements one of which will contact with the mine floor before the other tilts sufficiently to rest on the rails. It will also be noted that it is thus made possible to connect the swivel connection directly to the axle boxes and thus produce a more simple and rigid construction. It will also be observed that through the provision of the extension 19 on the rear of the element 5, it is possible to produce a construction which is more rigid during the process of transport, the machine resting upon that extension and upon the rear axle in such a manner as to form an exceedingly rigid construction. Attention is here also particularly directed to the fact that, by the provision of this extension, it is possible effectually to counterbalance the front element of the truck and also in a measure to counterbalance the rear element thereof. As brought out above, all tendency toward lateral movement of the element 5 is also thus overcome. These and other advantages of my improved construction will, however, be clearly apparent to those skilled in the art.

While I have in this application specifically described one embodiment which my invention may assume in practice, it will be understood that this form of the same is used for purposes of illustration and that the invention may be embodied in other forms without departing from its spirit, it being my intention to include all such forms within the scope of the appended claims.

What I claim as new and desire to secure by Letters Patent is:

1. In a mining machine truck, a plurality of wheeled truck elements, one of said elements comprising a machine supporting frame tiltable into inclined position for the loading of a machine thereon, axle boxes carried by one of said elements, and a pivotal connection between said other element and said axle boxes.

2. In a mining machine truck, a plurality of wheeled truck elements, one of said elements comprising a machine supporting frame tiltable into inclined position for the loading of a machine thereon, axle boxes carried by one of said elements, and a horizontally disposed pivotal connection between said other element and said axle boxes.

3. In a mining machine truck, a plurality of wheeled truck elements, axle boxes carried by one of said elements and having a rearwardly extending portion, and a pivotal connection between said rearwardly extending portion and the front end of the other element.

4. In a mining machine truck, a plurality of wheeled truck elements, axle boxes carried by one of said elements and having a plurality of laterally spaced rearwardly extending portions, and a pivotal connection between said rearwardly extending portions and the front end of the other element.

5. In a mining machine truck, a plurality of wheeled truck elements, axle boxes carried by one of said elements and having a rearwardly extending portion, and a pivotal connection between said rearwardly extending portion and the front end of the other element disposed adjacent the axis of the front wheels.

6. In a mining machine truck, a plurality of wheeled truck elements, axle boxes carried by one of said elements and having a rearwardly extending portion, and a pivotal connection between said rearwardly extending portion and the front end of the other element disposed below the surface of said elements.

7. In a mining machine truck, a plurality of wheeled truck supporting elements, axle boxes carried by one of said elements and having rearwardly extending portions, pivotal connections between said portions and the other element, and counterbalancing means carried on said first mentioned element and extending over said pivotal connection.

8. In combination, a plurality of pivotally connected wheeled truck elements, a machine guiding frame on one of the same having a rearwardly extending portion disposable angularly over or horizontally over the other element and having an open rear end, and truck driving mechanism carried on the other element adjacent said open rear end.

9. In a mining machine truck, the combination of a frame adapted to receive and support a mining machine, and a second frame hinged to the first mentioned frame, each frame supported upon and rotatable about a wheel supported axle, and said first mentioned frame when loaded being maintained at an angle to the horizontal.

10. In a mining machine truck, the combination of a front frame section and a rear frame section, each mounted independently of the other on wheels on an axis in a transverse plane intermediate of its ends and the forward end of the rear section being hinged to the rear part of the first section at a transverse line in front of the rear end of the first section whereby the adjacent end of the front section overlies the rear section, said parts being constructed and arranged so that said front frame section is disposed at an angle to the horizontal when said truck is loaded.

11. In combination, a plurality of pivotally connected truck elements, one of the elements being adapted to form an inclined plane along which a mining machine may move in loading and unloading and having an open rear end, and truck driving mechanism carried on the other element adjacent the open rear end of said first mentioned element and adapted to be driven by a mining machine, whereby a mining machine disposed on said first mentioned element may engage and drive said driving mechanism.

12. In a mining machine truck, the combination of a frame adapted to receive and support a mining machine, with a second frame hinged to the first mentioned frame, each frame being supported upon and tiltable about a wheel-supported axle, and said first mentioned frame when loaded being maintained at an angle to the horizontal by said second mentioned frame.

13. In a mining machine truck, a plurality of wheeled axles, axle boxes on one of said axles, a frame member mounted on said axle boxes, and a second frame member pivotally connected to said axle boxes, said frame members being adapted to be disposed at an angle to each other when said truck is in machine loading position.

14. In combination, in a mining machine truck, a wheeled machine supporting body comprising a pair of pivotally connected frame members, one of said frame members being tiltable to form an inclined plane along which a mining machine may move in loading and unloading and having an open rear end, and truck driving mechanism mounted upon the other of said frame members adjacent the open rear end of said first mentioned member, said first mentioned frame member being adapted to overlie said second mentioned frame member whereby a mining machine disposed on said first mentioned member may lie adjacent to and drive said truck driving mechanism.

In testimony whereof I affix my signature.

MORRIS P. HOLMES.